(12) United States Patent
Unno

(10) Patent No.: US 6,519,244 B1
(45) Date of Patent: Feb. 11, 2003

(54) CDMA TRANSMITTER CAPABLE OF REDUCING TRANSMISSION POWER

(75) Inventor: Yoshihiro Unno, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/406,716

(22) Filed: Sep. 28, 1999

(30) Foreign Application Priority Data

Sep. 28, 1998 (JP) .......................................... 10-273971

(51) Int. Cl.[7] .......................... H04B 7/216; H04J 11/00
(52) U.S. Cl. ...................................... 370/342; 370/208
(58) Field of Search ................................ 370/342, 335, 370/320, 208

(56) References Cited

U.S. PATENT DOCUMENTS 5,757,767 A * 5/1998 Zehavi ........................ 370/208

FOREIGN PATENT DOCUMENTS

| EP | 0991201 | * | 4/2000 |
| JP | 10-257017 | * | 9/1998 |
| JP | 2000-200177 | * | 2/2001 |

* cited by examiner

Primary Examiner—William Cumming
(74) Attorney, Agent, or Firm—Young & Thompson

(57) ABSTRACT

In a CDMA transmitter operable in response to a plurality of input data signals to produce a transmission signal, a dummy symbol is generated by a dummy symbol generator to reduce a peak value of a synthesized signal obtained by subjecting the input data signals to spread spectrum modulation. The dummy symbol is attained by spreading the peak value by spread codes which are not used for the spread spectrum modulation and is subtracted from the synthesized signal to suppress the peak value. A level adjustment value is multiplied by a peak suppressed signal so as to compensate a variation of average power which might occur due to the dummy symbol.

10 Claims, 4 Drawing Sheets

CDMA TRANSMITTER CAPABLE OF REDUCING TRANSMISSION POWER

BACKGROUND OF THE INVENTION

This invention relates to a transmitter for use in CDMA (Code Division Multiple Access), which will be called a CDMA transmitter.

In a conventional CDMA method which will be known as a wide band CDMA method, such as TIA/EIA/IS-95, a base station has a CDMA transmitter which is operable in response to a plurality of input data signals. The CDMA transmitter spreads the input data signals by the use of short codes, such as Walsh codes, and long codes, such as pseudo random sequences, and thereafter transmits a transmission signal through a power amplifier downwards (namely, from the base station to mobile stations).

In the base station, the input data signals are individually subjected to spread spectrum modulation and are synthesized into a synthesized signal. The synthesized signal is varied in electric power over a very wide range, depending upon a peak value of each input data signal. Moreover, a linear amplifier is used as the power amplifier to amplify the synthesized signal into the transmission signal.

Under the circumstances, it should be noted that the power amplifier should have high power so as to linearly amplify the synthesized signal varied over the wide range and is therefore inevitably very expensive. Taking this into consideration, a limiter is arrange prior to the power amplifier to limit an amplitude of the synthesized signal. However, such arrangement of the limiter deteriorates a transmission characteristic of the CDMA transmitter because the limiter itself is a nonlinear element.

SUMMARY OF THE INVENTION

It is an object of this invention to provide a CDMA transmitter which is capable of reducing transmission power.

It is another object of this invention to provide a CDMA transmitter of the type described, which can establish a reduction of transmission power without degrading a transmission characteristic.

It is still another object of this invention to provide a CDMA transmitter of the type described, which is inexpensive and small in size.

A CDMA transmitter to which this invention is applicable is operable in response to a plurality of input data signals to transmit a transmission signal, by subjecting the input data signals to symbol modulation, spread spectrum modulation, synthesizing, and amplification. According to an aspect of this invention, the CDMA transmitter comprises a peak detector for detecting peak electric power of the input data signals synthesized to produce a peak power signal representative of the peak electric power, a dummy symbol generator, supplied with the peak power signal, for generating a dummy symbol such that the peak electric power is decreased, and a calculation circuit for calculating the synthesized input data signals and the dummy symbol to produce the transmission signal.

The peak detector is supplied with each symbol of the input data signals which are subjected to the symbol modulation and the spread spectrum modulation and which are added by an adder. The peak detector detects the peak electric power of each symbol.

In addition, the CDMA transmitter further may comprise a delay circuit which has a delay time delaying each synthesized input data signals by a single symbol time and which produces a delayed synthesized data signal. In this event, the calculation circuit comprises a subtractor for subtracting the dummy symbol from the delayed synthesized data signal.

Herein, the above-mentioned dummy symbol generator comprises a comparator for comparing the peak power signal with a predetermined power level to detect whether or not the peak power signal exceeds the predetermined power level and a generating circuit for generating the dummy symbol when the peak power signal exceeds the predetermined power level.

The dummy symbol generator generates the dummy symbol which is orthogonal to the synthesized input data signals and which is generated by the use of a code sequence which is unused in the synthesized input data signals. The dummy symbol is generated by the dummy symbol generator by the use of Walsh codes.

Specifically, the dummy symbol generator comprises a plurality of code generators for producing a plurality of codes different from one another, a weight calculator for calculating weight coefficients given to the codes, with reference to the peak power signal detected by the peak detector, a multiplier for multiplying the plurality of the codes by the weight coefficients to produce multiplied codes, and an adder circuit for summing up the multiplied codes to produce the dummy symbol.

Furthermore, a CDMA transmitter may comprise a power adjustment circuit for adjusting transmission electric power with reference to the peak power signal.

A CDMA transmitter according to another aspect of this invention is operable in response to a plurality of input data signals to produce a transmission signal and comprises a spread section for spectrum spreading the input data signals by using a plurality of predetermined spread codes to produce a synthesized signal, a dummy symbol generator for generating a dummy symbol which is subjected to spread spectrum modulation by the use of spread codes which are different from the predetermined spread codes, and a combining section for combining the synthesized signal with the dummy symbol.

DESCRIPTION OF THE PREFERRED EMBODIMENTS

Figure 1:
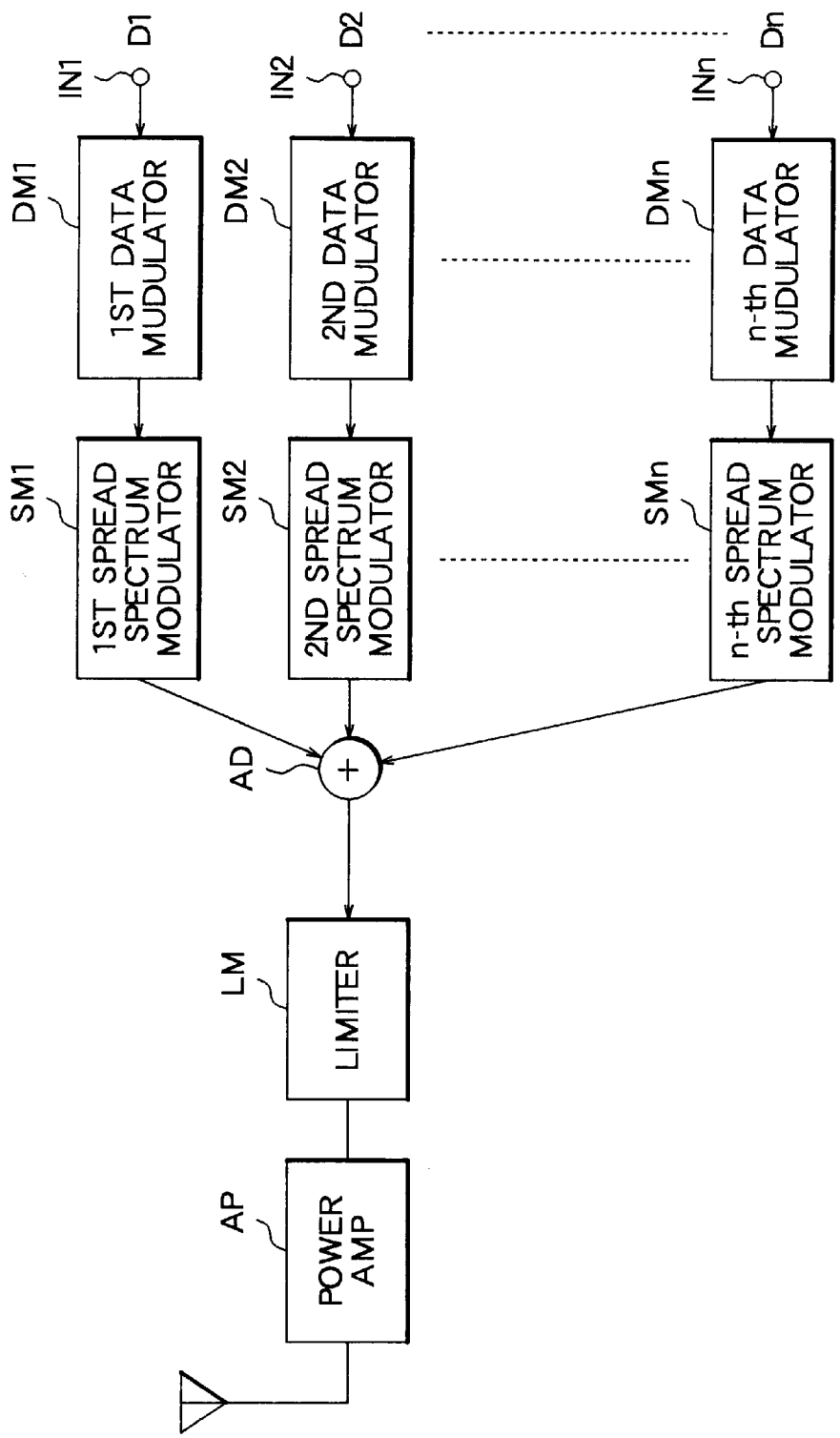
FIG. 1 shows a block diagram of a conventional CDMA transmitter.

Referring to FIG. 1, description will be made about a conventional CDMA transmitter for a better understanding of this invention. The illustrated CDMA transmitter has a plurality of input terminals IN1 to INn, n in number, where n is a positive integer. The input terminals IN1 to INn will be called first through n-th input terminals and are given from first through n-th users (not shown) first through n-th input data signals D1 to Dn representative of first through n-th transmission data, respectively. The first through the n-th input data signals D1 to Dn are sent to first through n-th data modulators DM1 to DMn, respectively, to be subjected to data modulation. Each of the first through the n-th input data signals D1 and Dn is modulated in each data modulator DM1 to DMn by a carrier into a modulated data signal in a base-band to be sent to each of first through n-th spread spectrum modulators SM1 to SMn. The data modulation may be, for example, QPSK. The first through the n-th spread spectrum modulators SM1 to SMn are operated to carry out spread spectrum modulation of the modulated data signals by the use of spread codes, such as Walsh codes, and/or pseudo random codes, (namely, short codes and/or long codes) and to produce first through n-th spectrum spread signals, respectively. The first through the n-th spectrum spread signals are given to an adder AD to be summed up and to be produced as a summed signal.

Thereafter, the summed signal is limited by a limiter LM and is thereafter sent to a power amplifier, namely, a transmission amplifier AP to be transmitted as a transmission signal through an antenna. In this event, the power amplifier is usually formed by a linear amplifier.

It is to be noted here that the transmission signal has peak electric power as transmission power on transmission from the illustrated CDMA transmitter. For example, let each of the first through the n-th spectrum spread signals be transmitted with 1 Watt for each user and the number of the users be equal to ten in number. In this case, average electric power for ten users is equal to ten Watts. However, peak electric power must become ten times the average electric power and is therefore equal to 100 Watts.

In the illustrated example, the limiter LM limits peak electric power of the summed signal at a limit electric power level which corresponds to a saturation output level of the power amplifier AP. In other words, the electric power which exceeds the limit electric level is forcibly and nonlinearly cut out by the limiter LM. Such nonlinear operation by the limiter LM inevitably degrades a signal transmission characteristic in the conventional CDMA transmitter.

Moreover, the conventional CDMA transmitter should have the power amplifier AP of very high power so as to linearly amplify an output signal given to the power amplifier AP. Such a power amplifier AP of high power consumes large electric power. Inasmuch as the power amplifier AP becomes expensive in proportion to an increase of the power consumption, it may be said that a cost of a whole of the CDMA transmitter is determined by the cost of the power amplifier AP.

Figure 2:
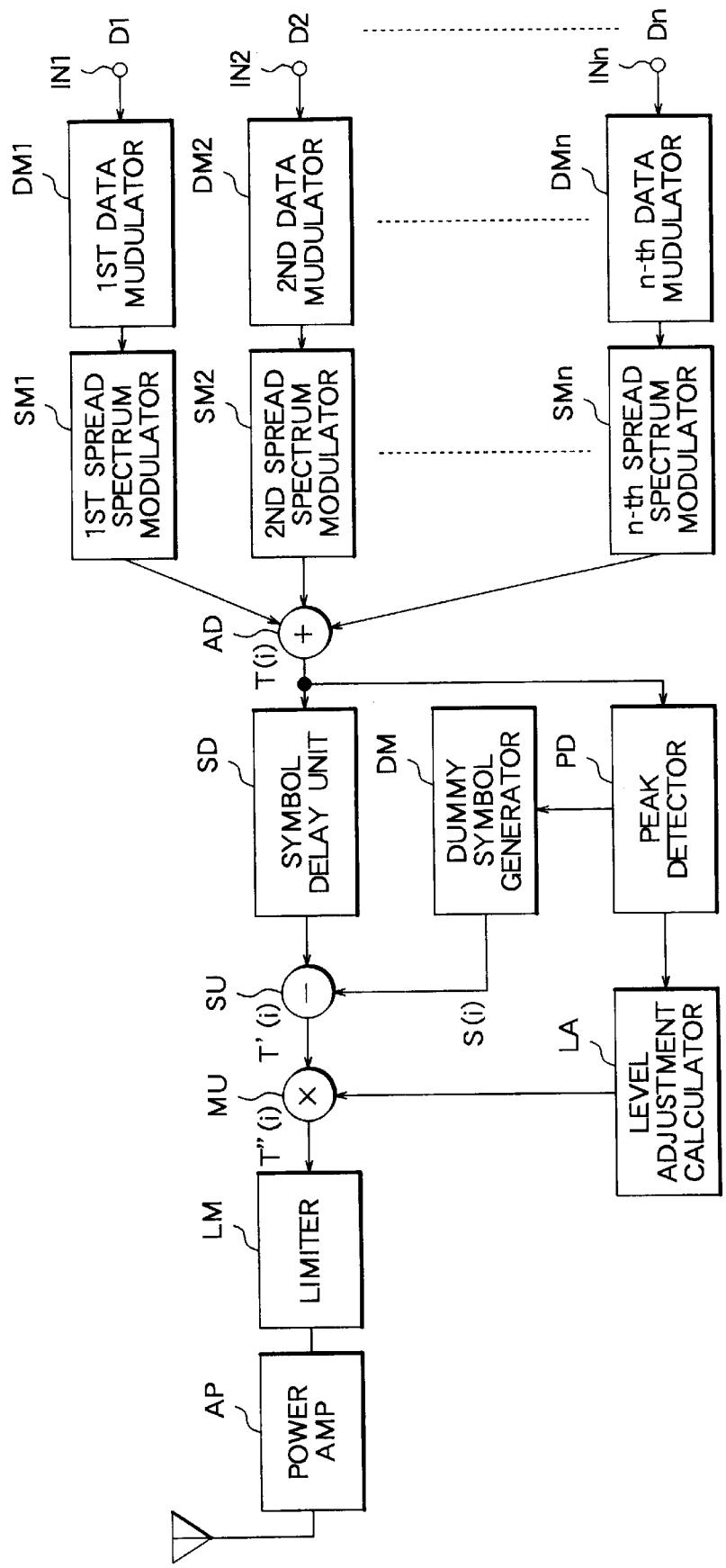
FIG. 2 shows a block diagram of a CDMA transmitter according to an embodiment of this invention.

Referring to FIG. 2, a CDMA transmitter according to a first embodiment of this invention comprises similar parts designated by like reference numerals and symbols. Herein, it is assumed that the first through the n-th spread spectrum modulators SM1 to SMn carry out the spread spectrum modulation by the use of the Walsh codes of 32 ksps (kilo symbol per second) and are assumed to be smaller in number than the Walsh codes. This shows that unused ones of the Walsh codes are left in the CDMA transmitter. Although description will be made only about the Walsh codes, any other short and/or long codes may be assigned to the first through the n-th spread spectrum modulators SM1 to SMn, with unused codes left in such short and/or long codes.

In the illustrated example, the adder AD produces the summed signal which is depicted by T(i) in FIG. 2 and which may be called a synthesized signal. Moreover, it is readily understood in FIG. 2 that the CDMA transmitter further comprises a symbol delay unit SD, a peak detector PD, a dummy symbol generator DM, a level adjustment calculator LA, a subtractor SU, and a multiplier MU. All of the enumerated units are located between the adder AD and the limiter LM.

Specifically, the summed or synthesized signal T(i) is formed by a sequence of symbols, as readily understood from the above, and given to the symbol delay unit SD and the peak detector PD. The synthesized signal T(i) is delayed by the symbol delay unit SD by a single symbol time to be sent to the subtractor SU as a delayed signal. On the other hand, the peak detector PD detects a peak value (a maximum value of electric power) at every symbol of the synthesized signal T(i). The peak value detected by the peak detector PD is delivered to the dummy symbol generator DM on one hand and to the level adjustment calculator LA on the other hand.

The dummy symbol generator DM generates a dummy symbol with reference to the peak value in a manner to be described later in detail. At any rate, the dummy symbol serves to reduce or cancel the peak value of each symbol of the synthesized signal T(i) and is sent to the subtractor SU which is supplied with the synthesized signal T(i).

The subtractor SU subtracts the peak value from the synthesized signal at every symbol to produce a peak suppressed or canceled signal.

On the other hand, the level adjustment calculator LA calculates a power correction value (level adjustment value) from the peak value to produce a power correction signal (or a level adjustment signal) representative of the power correction value (or the level adjustment value).

Supplied with the power correction signal and the peak suppressed signal, the multiplier MU multiplies the peak suppressed signal by the power correction signal to produce a product signal representative of a product of the peak suppressed signal and the power correction signal. The product signal is sent through the limiter LM to the power amplifier AP and is linearly amplified by the power amplifier AP into the transmission signal.

With this structure, it is possible to reduce a peak value of the transmission signal sent from the power amplifier AP, when the peak value (depicted by Pmax) detected by the peak detector PD exceeds maximum acceptable input power (Pin) determined in the power amplifier AP.

More specifically, the dummy symbol generator DM judges whether or not the peak value detected by the peak detector PD is greater than the maximum acceptable input power (Pin) of the power amplifier AP. As a result, when it is judged that the peak value is greater than the maximum acceptable input power P(in), the dummy symbol generator DM generates the dummy symbol S(i) which can cancel the peak value of each symbol of the synthesized signal T(i). Such a dummy symbol S(i) is subtracted from each symbol of the synthesized signal delayed by the symbol delay unit SD by the subtractor SU. In consequence, the peak suppressed signal is produced by the subtractor SU and is sent to the multiplier MU.

In FIG. 2, a combination of the data modulators DM1 to DMn, the spread spectrum modulators SM1 to SMn, and the adder AD may be referred to as a spectrum spread section while a combination of the peak detector PD and the dummy symbol generator DM may be referred to as a dummy symbol section. The remaining elements may be collectively called a combination section for combining the synthesized signal with the dummy symbol.

Brief description will be made about the dummy symbol generator DM for a better understanding of this invention. In the example being illustrated, it is assumed that the dummy symbol generator DM generates the dummy symbol S(i) which is orthogonal to the synthesized signal, namely, each of transmission symbols and which may be formed by the Walsh codes. In this event, it is to be noted that the Walsh codes which are used for the dummy symbol are selected from the Walsh codes which are not used to spread the first through the n-th input data signals D1 to Dn in the first through the n-th spread spectrum modulators SM1 to SMn. In other words, the Walsh codes for the dummy symbol S(i) are unused for transmission of the first through the n-th input data signals D1 to Dn and may be called unused codes.

Under the circumstances, operation of the dummy symbol is given by:

$$S(i) = \sum_j AjW(i,j)$$

In the above equation, j is not smaller than zero and is smaller than K; and i, not smaller than zero and is smaller than L. In addition, S(i) is representative of the dummy symbol; L, a symbol length; K, the number assigned to the Walsh codes; W(i,j), a value of an i-th symbol in the j-th one of the Walsh codes; and Aj, a coefficient of an amplitude.

In the above equation, it is possible to maximize a combination of peak factors at the peak value by selecting Aj. In other words, the peak value is spectrum spread by the use of the unused Walsh codes.

Figure 3:
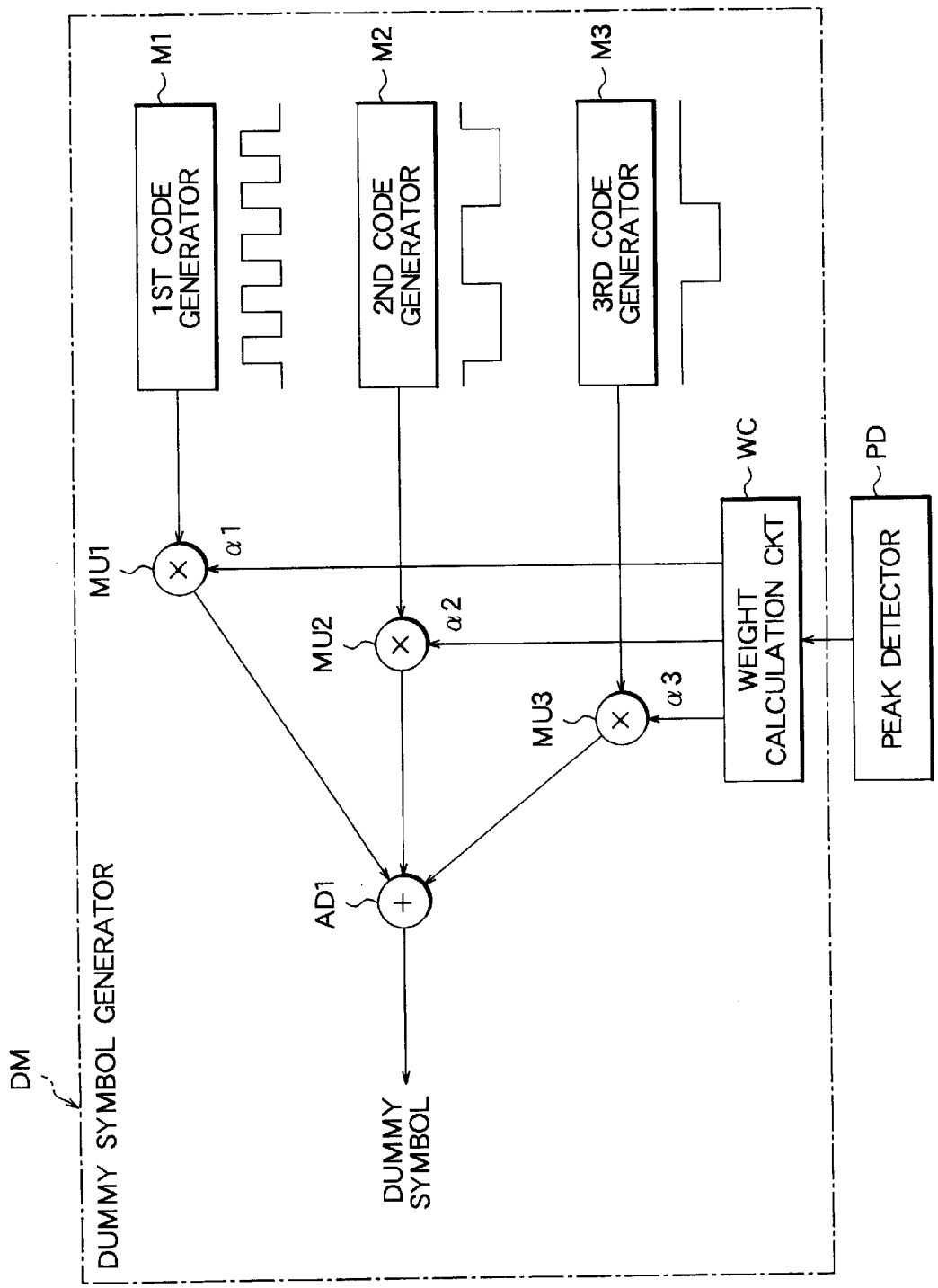
FIG. 3 shows a block diagram of a dummy symbol generator used in the CDMA transmitter illustrated in FIG. 2.

Referring to FIG. 3, description will be made about the dummy symbol generator DM in detail. In the illustrated example, the dummy code generator DM has first through third code generators M1 to M3 which may be formed by code memories to produce first through third unused Walsh codes W1 to W3 which are not used for the first through the n-th input data signals D1 to Dn. The first through the third unused Walsh codes W1 to W3 may have waveforms as exemplified under each code generator M1 to M3 in FIG. 3.

The dummy symbol generator DM illustrated in FIG. 3 has a weight calculation circuit WC which is supplied with the peak value from the peak detector PD. Supplied with the peak value, the weight calculation circuit WC calculates first, second, and third weight coefficients α1, α2, and α3 determined for the first through the third unused Walsh codes W1 to W3 on the basis of the peak value, respectively. The first through the third weight coefficients α1, α2, and α3 are sent to first, second, and third multipliers MU1, MU2, and MU3 as first through third weight coefficient signals, respectively.

The above-mentioned calculation may be executed only when the peak value exceeds the acceptable maximum input power Pin of the power amplifier AP. In this case, the weight calculation circuit WC may have a comparator for comparing the peak value with the acceptable maximum input power Pin. Alternatively, the weight calculation circuit WC may be structured so that the weight coefficients α1, α2, and α3 may take zero as long as the peak value does not exceed the acceptable maximum input power Pin.

At any rate, the first through third weight coefficients α1, α2, and α3 are given to the first through the third multipliers MU1 to MU3 which are supplied with the first through the third unused Walsh codes W1 to W3, respectively. The first through the third multipliers MU1 to MU3 multiply the first through the third unused Walsh codes W1 to W3 by the first through the third weight coefficients α1, α2, and α3 to supply first through third multiplied Walsh codes to an adder AD1. The first through the third multiplied Walsh codes are summed up by the adder AD1 to obtain a sum signal. The sum signal is sent to the subtractor SU (FIG. 2) as the dummy symbol S(i).

In order to describe the operation of the dummy code generator DM more in detail, it is assumed that a peak value of the dummy symbol S(i) is representative of a weight coefficient α while α1>0, α2<0, and α3>0 and that a restriction condition is given by /α1/=/α2/=/α3/=α. In addition, a reduction rate of each code with respect to each input data signal D1 to Dn is assumed to be represented by β. Under the circumstances, each coefficient mentioned above can be simplified into α=β/3, α1=β/3, α2=−β/3, and α3=β/3 and the dummy symbol S(i) is small in the peak value as compared with each code. Practically, it has been confirmed that the dummy symbol S(i) has small average electric power.

The dummy symbol S(i) which is calculated in the above-mentioned manner is delivered to the subtractor SU shown in FIG. 2 to subtract the dummy symbol S(i) from the delayed synthesized signal T(i) and to obtain the peak suppressed signal which will be represented by T'(i) hereinafter.

In this event, the peak suppressed signal T'(i) is given by:

$$T'(i)=T(i)-S(i).$$

In the above-mentioned example, although subtraction of the dummy symbol S(i) from the delayed synthesized signal T(i) has been executed in the illustrated circuit, the peak value of the delayed synthesized signal T(i) may be decreased by the dummy symbol S(i). This means that addition of the dummy symbol S(i) to the delayed synthesized signal T(i) may be executed, if a reduction is possible about the peak value of the delayed synthesized signal T(i).

Herein, it is to be noted that a distribution of the electric power, namely, the average electric power is varied in the peak suppressed signal by modifying the delayed synthesized signal T(i) by the dummy symbol S(i) in the above-mentioned manner. Taking this into account, compensation of the electric power is carried out in accordance with a predetermined algorithm. To this end, the level adjustment calculator LA calculates a power adjustment value τ which may be called a power correction value.

Specifically, the power adjustment value τ is determined so that the following formula is satisfied:

$$P\text{in} \leq \tau \times P\text{max} \qquad (1)$$

(where 0<τ≤1).

Namely, the power adjustment value τ is determined in consideration of the acceptable maximum input power Pin of the power amplifier AP.

The multiplier MU multiplies the peak suppressed signal T'(i) by the power adjustment value τ to produce a power adjusted signal T''(i) given by:

$$T''(i)=\tau \times T'(i).$$

The power adjusted signal T''(i) is sent to the limiter LM which limits the amplitude of the power adjusted signal T''(i) at a predetermined limit level which may be equal to Pin. Thus, the power adjusted signal T''(i) may exceed Pin because the power adjusted signal T''(i) higher than Pin is limited by the limiter LM. However, it is preferable that the power adjustment value τ is determined in accordance with an algorithm which can avoid both degradation of a transmission characteristic due to the limiter LM and deterioration which occurs due to compensation or modification of the input data signals.

Alternatively, it is possible to lessen or suppress a level decrease of the peak value in the synthesized signal due to the dummy symbol to a degree and, instead, to adjust or compensate a suppressed component by the power adjustment value τ.

More specifically, let the synthesized signal T(i), the dummy symbol S(i), and the power adjusted signal T"(i) have electric power Poriginal, Pdummy, and Pout, respectively. In this case, a relationship among Poriginal, Pdummy, and Pout is defined by:

$$Pout = \tau(Poriginal + \gamma Pdummy), \quad (2)$$

where $0 < \tau \leq 1$, $0 < \gamma \leq 1$.

From Equation (2), it is readily understood that, as the power adjustment value τ becomes large, a ratio of the second component of the right-hand side of Equation (2) to Pout becomes relatively small. In other words, an influence of the dummy symbol becomes small. This is effective to lighten a load imposed on the power amplifier AP.

In the above-mentioned embodiment, the symbol delay unit SD is used to delay the synthesized signal by one symbol. However, such a symbol delay unit may be removed when high speed elements are used. This structure serves to shorten a processing time and a delay time.

Figure 4:
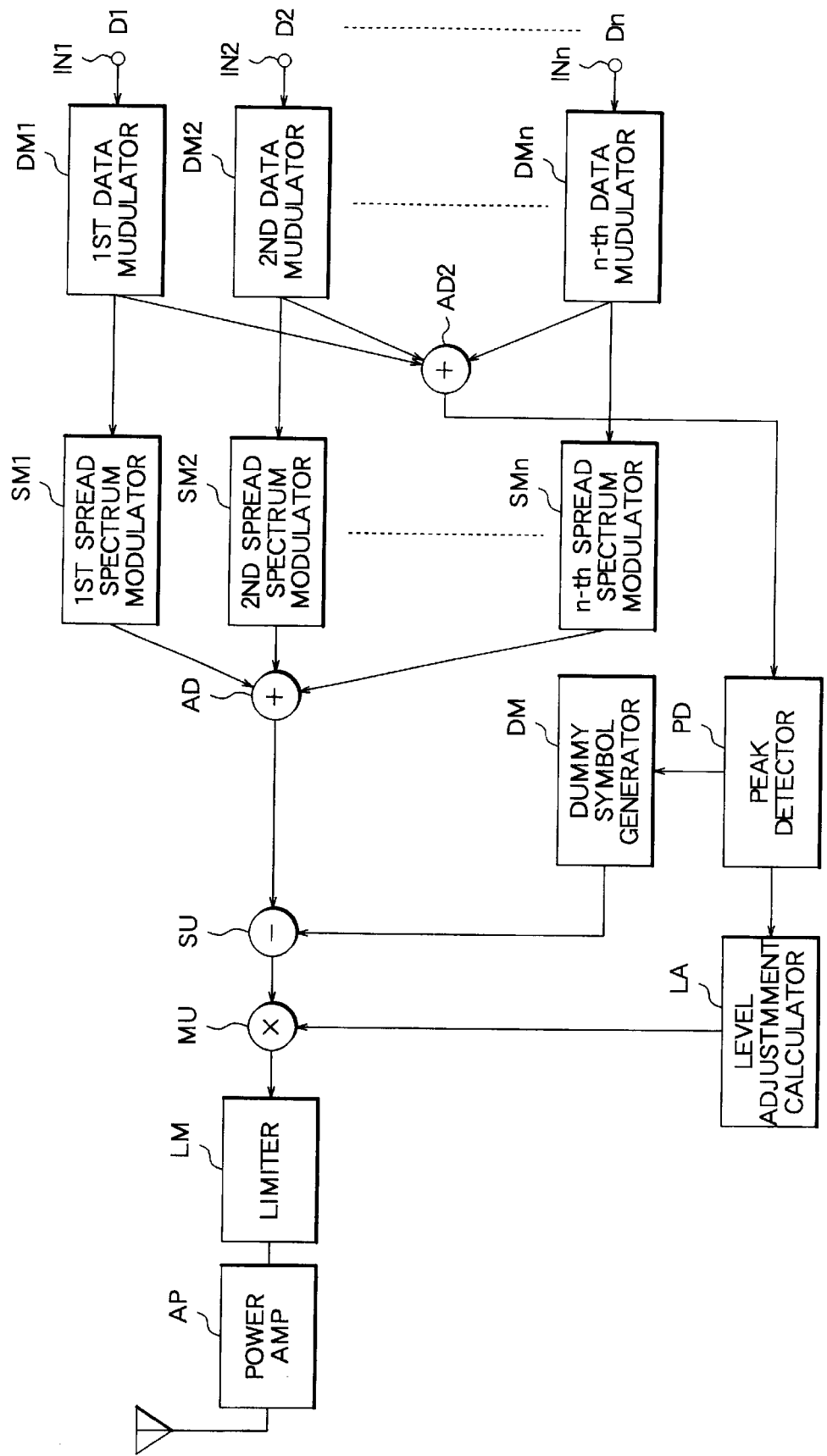
FIG. 4 shows a block diagram of a CDMA transmitter according to a modification of the CDMA transmitter illustrated in FIG. 2.

Referring to FIG. 4, a CDMA transmitter according to a modification of this invention comprises similar parts designated by like reference symbols and dispenses with the symbol delay unit SD illustrated in FIG. 2. In the illustrated example, the first through the n-th input data signals D1 to Dn are subjected to data modulation, such as QPSK, to be sent as first through n-th data modulated signals (namely, symbol modulated signals) to the first through the n-th spread spectrum modulators SM1 to SMn on one hand and to an additional adder AD2 on the other hand.

The first through the n-th data modulated signals are delivered to the first through the n-th spread spectrum modulators SM1 to SMn to be processed by the first through the n-th spread spectrum modulators SM1 to SMn in a manner similar to that illustrated with reference to FIG. 2. Like in FIG. 2, the first through the n-th spectrum spread signals are sent to the adder AD to be produced as the synthesized signal T(i).

In FIG. 4, it is noted that the synthesized signal T(i) is directly supplied to the subtractor SU without any symbol delay.

On the other hand, the additional adder AD2 sums up the first through the n-th data modulated signals to supply a summed signal to the peak detector PD. The peak detector PD detects a peak value from the summed signal. The peak value detected is sent to the dummy symbol generator DM and the level adjustment calculator LA. The dummy symbol generator DM generates, on the basis of the peak value, the dummy symbol which can cancel or decrease the peak value and supplies the dummy symbol to the subtractor SU.

The subtractor SU subtracts the dummy symbol from the synthesized signal sent from the adder AD to produce a peak suppressed signal, as mentioned in conjunction with FIG. 2.

In FIG. 4 also, the level adjustment calculator LA calculates the power adjustment value from the peak value detected by the peak detector PD. In addition, the power adjustment value is multiplied by the multiplier MU by the peak suppressed signal to be sent as the transmission signal through the limiter LM and the power amplifier AP to the antenna.

As mentioned above, the dummy symbol is used to modify the peak value of the synthesized signal and to reduce the electric power of the power amplifier AP. This structure is effective to decrease the peak electric power and to alleviate requirements for the power amplifier. For example, when the power amplifier AP can reduce the transmission power by 3 dB, the cost of the power amplifier AP can be reduced to one fourth and becomes very inexpensive. This shows that the power amplifier AP may be small in size and in electric power. Moreover, the electric power of the peak suppressed signal is adjusted by the level adjustment value prior to the supply to the power amplifier. This structure can compensate a variation of the electric power which might occur due to addition of the dummy symbol and can avoid a variation of the average electric power.

In the meanwhile, the CDMA transmitter transmits the transmission signal which carries not only the input data signals but also the dummy signal. However, such a dummy signal is not demodulated by any receivers because the dummy signal is spread by the use of the spread codes which are not used for transmission, as mentioned before. In other words, the transmission signal which includes the dummy symbol can be received by usual CDMA receivers regardless of inclusion of the dummy signals.

While this invention has thus far been described in connection with a few embodiments thereof, it will be readily possible for those skilled in the art to put this invention into practice in various other manners. For example, the dummy symbol may be superposed on the synthesized signal for another purpose different from the reduction of the peak value of the synthesized signal.

What is claimed is:

1. A CDMA transmitter operable in response to a plurality of input data signals to transmit a transmission signal, by subjecting the input data signals to symbol modulation, spread spectrum modulation, synthesizing, and amplification, comprising:

a peak detector for detecting peak electric power of the input data signals synthesized to produce a peak power signal representative of the peak electric power;

a dummy symbol generator, supplied with the peak power signal, for generating a dummy symbol such that the peak electric power is decreased; and a calculation circuit for calculating the synthesized input data signals and the dummy symbol to produce the transmission signal.

2. A CDMA transmitter as claimed in claim 1, wherein the peak detector is supplied with each symbol of the input data signals which are subjected to the symbol modulation and the spread spectrum modulation and which are added by an adder;

the peak detector detecting the peak electric power of each symbol.

3. A CDMA transmitter as claimed in claim 2, further comprising a delay circuit which has a delay time delaying each synthesized input data signals by a single symbol time and which produces a delayed synthesized data signal;

the calculation circuit comprising:

a subtractor for subtracting the dummy symbol from the delayed synthesized data signal.

4. A CDMA transmitter as claimed in claim 1, wherein the dummy symbol generator comprises:

a comparator for comparing the peak power signal with a predetermined power level to detect whether or not the peak power signal exceeds the predetermined power level; and a generating circuit for generating the dummy symbol when the peak power signal exceeds the predetermined power level.

5. A CDMA transmitter as claimed in claim 1, wherein the dummy symbol generator generates the dummy symbol which is orthogonal to the synthesized input data signals.

6. A CDMA transmitter as claimed in claim 5, wherein the dummy symbol generator generates the dummy symbol by using a code sequence which is unused in the synthesized input data signals.

7. A CDMA transmitter as claimed in claim 6, wherein the dummy symbol is generated by the dummy symbol generator by the use of Walsh codes.

8. A CDMA transmitter as claimed in claim 1, wherein the dummy symbol generator comprises:

a plurality of code generators for producing a plurality of codes different from one another;

a weight calculator for calculating weight coefficients given to the codes, with reference to the peak power signal detected by the peak detector;

a multiplier for multiplying the plurality of the codes by the weight coefficients to produce multiplied codes; and an adder circuit for summing up the multiplied codes to produce the dummy symbol.

9. A CDMA transmitter as claimed in claim 1, further comprising:

a power adjustment circuit for adjusting transmission electric power with reference to the peak power signal.

10. A CDMA transmitter operable in response to a plurality of input data signals to produce a transmission signal, comprising:

a spread section for spectrum spreading the input data signals by using a plurality of predetermined spread codes to produce a synthesized signal;

a dummy symbol generator for generating a dummy symbol which is subjected to spread spectrum modulation by the use of spread codes which are different from the predetermined spread codes; and a combining section for combining the synthesized signal with the dummy symbol.

* * * * *